March 20, 1956     A. J. ROSENBERGER     2,738,771
REGULATORS

Filed Aug. 2, 1951     2 Sheets-Sheet 1

INVENTOR:
Albert J. Rosenberger,
BY
E. J. Both,
ATTORNEY

March 20, 1956  A. J. ROSENBERGER  2,738,771
REGULATORS
Filed Aug. 2, 1951  2 Sheets-Sheet 2
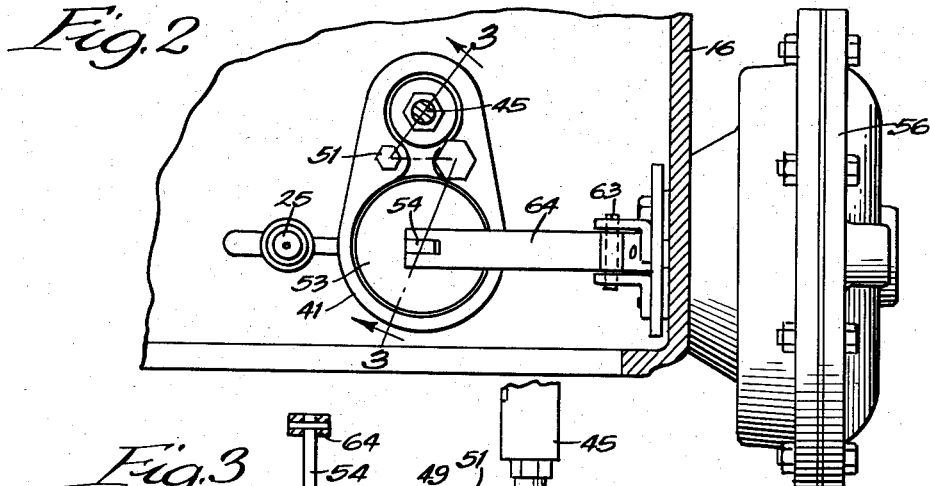
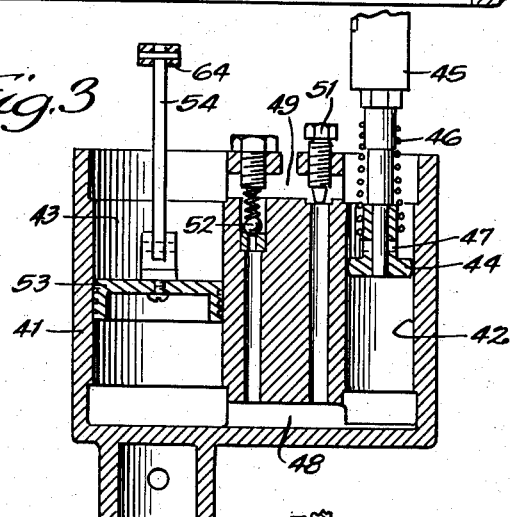
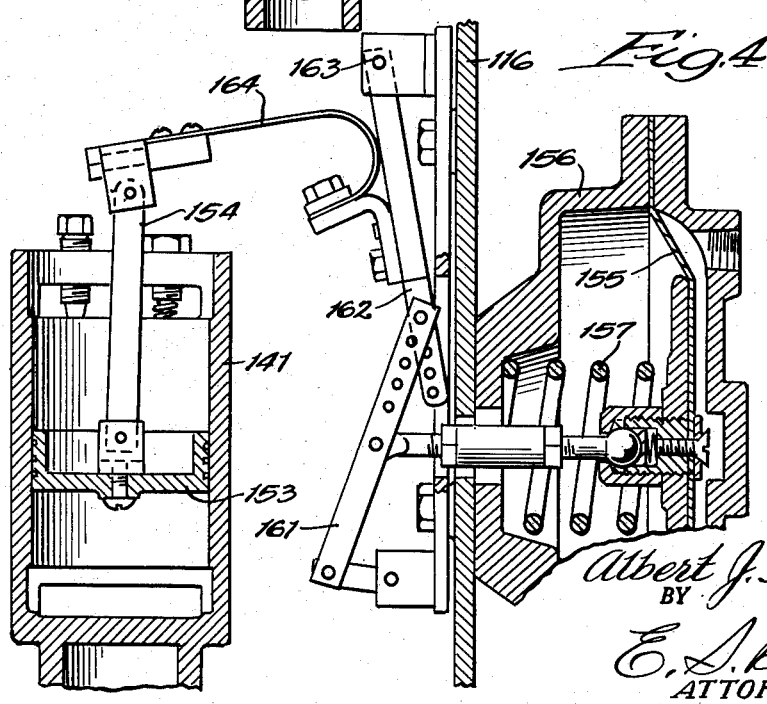
INVENTOR:
Albert J. Rosenberger,
BY
E. S. Booth,
ATTORNEY

United States Patent Office 2,738,771
Patented Mar. 20, 1956

2,738,771
REGULATORS

Albert J. Rosenberger, Chicago, Ill., assignor to Republic Flow Meters Company, Chicago, Ill., a corporation of Illinois Application August 2, 1951, Serial No. 239,892

12 Claims. (Cl. 121—41)

This invention relates to regulators, and more particularly to a regulator of the resetting type to control a condition which is affected by a second condition.

Regulators as heretofore constructed have sensed the departure of the condition from a desired value and have then effected a control operation to return the condition to the desired value. Ordinarily such regulators are provided with stabilizing means so that they will not cycle continuously. All such regulators, however, require a departure of the condition from the desired value to initiate their operation and necessarily involve some delay in effecting the control operation to return the condition to its desired value.

There is always a cause for departure of the main condition from its desired value or control point, such as a change in a second condition affecting the main condition. For example, a departure of the pressure in a furnace from its control point is preceded by a change in the combustion rate, a change in boiler drum level is normally preceded by a change in steam flow, and a change of pressure in a tank is preceded by a change in the flow to or from the tank. It is one of the principal features of the present invention to utilize the change of a second condition affecting a main condition to operate or reset the regulator without waiting for a change in the main condition to occur.

It is another object to provide a regulator in which the operation is controlled by a change in either the main condition or a second condition which affects the main condition.

Still another object is to provide a regulator in which a change in the second condition resets the regulator in advance of a change in the main condition.

According to one feature of the invention, the controlling force applied in response to a change in the second condition is a resilient force to produce a proportioning action.

A further object is to provide a regulator in which a motor unit is connected through a dashpot to the sensing element and a second dashpot communicating with the first dashpot has its piston controlled independently of the motor unit and the sensing element. Preferably the piston of the second dashpot is controlled in response to a second condition through a diaphragm or the like, to provide an advance reset action.

The above and other objects and advantages of the invention will be more readily apparent from the following description when read in connection with the accompanying drawings in which Figure 1 is a section wtih parts in elevation of a regulator embodying the invention;

Figure 2 is a partial horizontal section on the line 2—2 of Figure 1;

Figure 3 is a broken section on the line 3—3 of Figure 2, and

Figure 4 is a partial section showing an alternative construction.

Figure 1:
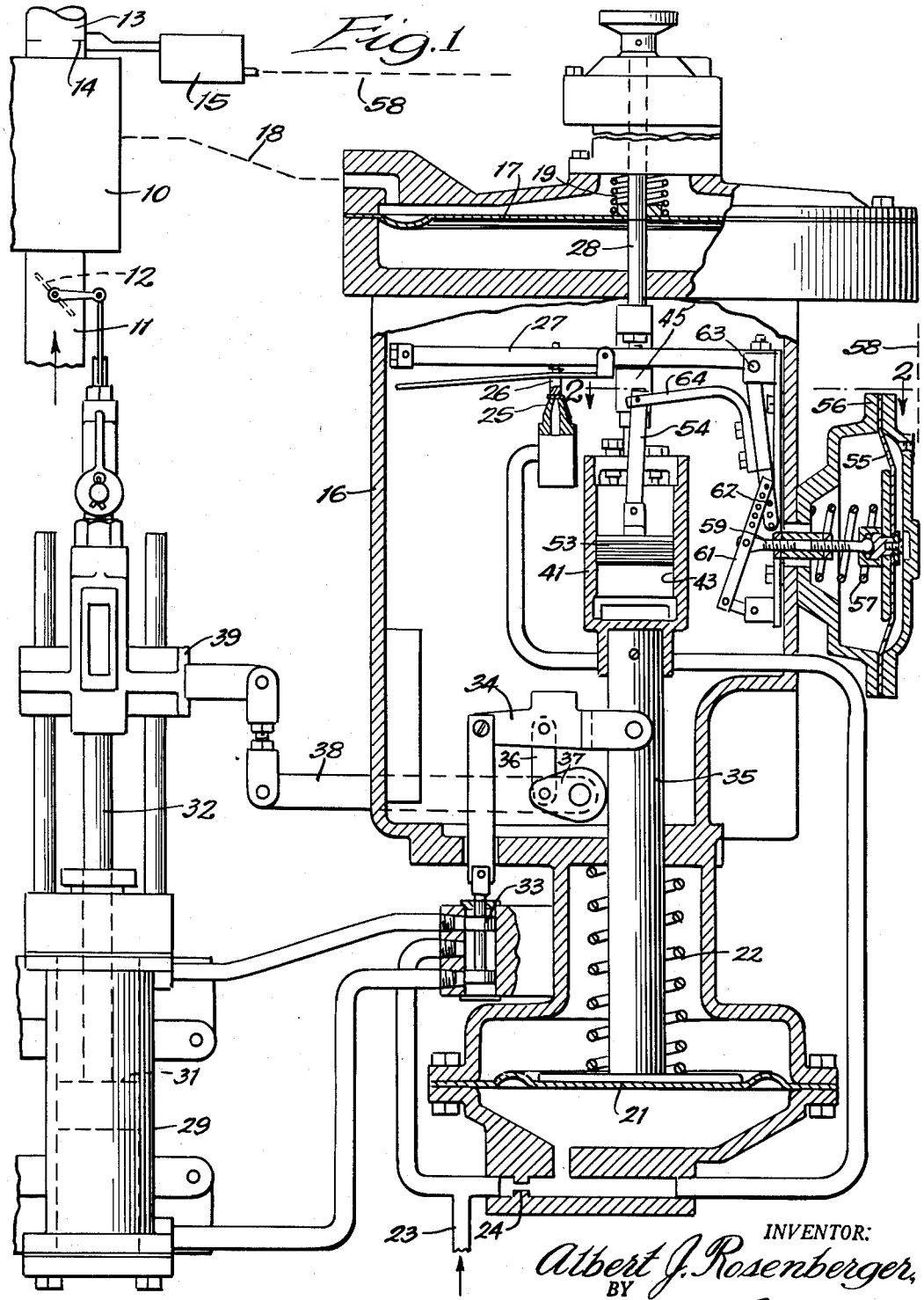

As shown in Figure 1, the regulator is illustrated for purposes of simplicity of description as controlling the pressure in a tank 10 which is supplied through an inlet conduit 11 having a control valve 12 therein. Fluid flows from the tank through an outlet conduit 13 provided with an orifice 14. The drop across the orifice is measured by a transmitter unit 15 which may be of the type more particularly described and claimed in my Patent No. 2,354,423 to produce a regulated pressure inversely proportional to the flow through the outlet conduit.

The regulator comprises a casing or housing 16 formed with a chamber at its top to receive a flexible diaphragm 17, the upper surface of which is connected as indicated by the dotted line 18 to the tank 10. The diaphragm is urged downward by the pressure on its upper surface which is balanced by a tension spring 19 so that the diaphragm will assume a position corresponding to the pressure in the tank 10. The diaphragm controls an amplifier or fluid motor shown as a flexible diaphragm 21 enclosed in a housing at the lower part of the regulator casing and urged downward by a spring 22. The lower surface of the diaphragm 21 is supplied with air under pressure from a source 23 through a restricted orifice 24. The space below the diaphragm is connected to a bleed nozzle 25, the flow through which is controlled by a valve member 26 carried by a pivoted beam 27. The beam 27 is connected to the diaphragm 17 by a rod 28 so that as the diaphragm moves the pressure beneath the diaphragm 21 will be increased or decreased to cause the diaphragm 21 to move.

Movement of the diaphragm 21 is utilized to adjust the valve 12 and for this purpose the diaphragm 21 may be connected directly to the valve 12. As shown, a second fluid motor comprising a power relay unit is controlled by the diaphragm 21 to operate the valve. The second motor includes a cylinder 29 in which a piston 31 is slidable. The piston 31 is connected through a piston rod 32 to the valve 12 to adjust it. The cylinder 29 has its opposite ends connected through pipes to the end ports of a pilot valve shown as having a shiftable spool 33 to control connection of the cylinder ends to pressure and exhaust respectively. A central port in the pilot valve may be connected to the air supply conduit 23 so that when the pilot valve spool is moved upward pressure will be supplied to the upper end of the cylinder 29 and the lower end will be vented while when the pilot valve spool is moved downward these connections will be reversed.

The pilot valve is operated by the diaphragm 21 and the piston rod 32 through a follow-up linkage so that the piston 32 will always move to a position corresponding to the position of the diaphragm. As shown, this linkage comprises a lever 34 pivoted at one end to a stem 35 connected to the diaphragm 31 and at its opposite end to the valve plunger 33. The central part of the lever is pivoted through a link 36 to an arm 37 which is connected through a link 38 to a head 39 which is secured to the piston rod 32 to move therewith.

With this linkage when the diaphragm 21 moves upward the pilot valve will be shifted down to admit pressure to the lower end of the cylinder 29 and move the piston 31 and piston rod 32 upward. As the piston rod 32 moves upward the link 36 will be raised to raise the center portion of the lever 34 and raise the pilot valve to its shut-off or lapped position.

To reset the regulator and prevent hunting thereof, the motor diaphragm 21 is connected to the sensitive diaphragm 17 through a dashpot. As shown the upper end of the rod 35 carries a dashpot head 41 which is formed with two open topped cylinders 42 and 43 adapted to contain a liquid such as oil. The cylinder 42 as best seen in Figure 3, receives a piston 44 which is connected through a piston rod 45 to the rod 28. When the motor diaphragm 21 moves it acts through the dashpot to exert a force on the sensitive diaphragm 17 and on the control valve 26 opening to move the control valve back to its normal position so that the movement of the motor diaphragm will be stopped to prevent overshooting and hunting.

Preferably, the piston 44 as shown, fits slidably over the end of the piston rod 45 and is urged upward thereon by a tension spring 46. The piston is formed with vent openings 47 in its sides which are normally closed by the piston rod and which will be opened in the event the pressure differential across the piston tending to move it downward becomes excessive thereby to limit the force which can be exerted in the downward direction on the piston by the dashpot mechanism.

The two cylinders 42 and 43 are in open communication at their bottoms through a passage 48 and are also in open communication at their tops through an open passage 49. The passage 48 is vented past an adjustable needle type valve 51 which enables liquid to flow from the space beneath the pistons to the space above them. Preferably a relief valve 52 is also provided to open in response to a predetermined pressure beneath the pistons thereby to limit the force which can be exerted by the dashpot structure.

The dashpot cylinder 43 receives the piston 53 which is connected through a pivoted link 54 to a control mechanism mounted on the casing 16. In the form shown, the piston 53 is adapted to be moved in response to changes in the flow from the tank 10 to reset the regulator in advance of an actual change of pressure in the tank. For this purpose a sensitive diaphragm 55 is provided in a housing 56 carried by the main casing 16. A spring 57 urges the diaphragm outward of the housing and its outer surface is connected as indicated by the dotted line 58 to the transmitter 15 to receive regulated pressure therefrom.

The rod 59 connects the diaphragm to a pivoted lever 61 which is formed in its length with a series of spaced holes. The lever 61 may be connected through any one of the several holes therein with a second lever 62 formed with a similar series of holes and pivoted on the main housing at 63. An angular arm or bracket 64 on the lever 62 is connected to the upper end of the link 54 to control the piston 53.

Assuming that the flow from the tank 10 remains constant, the regulator will function in much the same manner as a conventional reset regulator. If there is an increase in pressure in the tank due, for example, to an increase in the supply source pressure, the diaphragm 17 will move downward to move the valve 26 toward the nozzle 25 and increase the pressure beneath the motor diaphragm 21. This diaphragm will therefore move upward and will cause the piston 31 and piston rod 32 to move upward correspondingly to close the valve 12 thereby to reduce the pressure in the tank. When the motor diaphragm 21 moves upward it will act through the dashpot mechanism to push the diaphragm 17 up and move the valve 26 away from the nozzle 25 so that movement of the motor diaphragm and of the control valve 12 will be stopped before the pressure in the tank has returned to the control point. This operation as described, is the conventional reset regulator operation.

With the present construction, however, the effect of the dashpot mechanism is multiplied when the piston 53 is held stationary. As the cylinder unit 41 is moved upward pressure beneath both of the pistons 44 and 53 will be increased to push upward on the piston rod 45 and on the control valve 26. However, since the piston 53 remains substantially stationary, it will displace liquid from the cylinder 43 into the cylinder 42 to increase the upward force on the piston 44 over what would be present with a single dashpot unit. Thus the cylinder area in the dashpot unit can be made smaller than normal particularly when the area of the cylinder 43 is greater than that of the cylinder 42 as shown.

Assuming now that there is an increase in flow through the outlet conduit 13 with other conditions remaining the same. When this occurs the regulated pressure produced by the transmitter 15 will decrease so that the diaphragm 55 will move to the right under the influence of the spring 57. This will move the piston 53 downward pumping liquid from the cylinder 43 into the cylinder 42 to raise the piston 44 thereby raising the valve 26 from the nozzle 25. At this time the pressure below the motor diaphragm 21 will decrease so that the motor diaphragm will move downward under the influence of the spring 22. The piston 31 will follow this downward motion to rock the main valve 12 clockwise thereby to increase the supply of fluid to the tank 10.

Since there will be a lag between an increase in flow from the tank and a drop of pressure in the tank, itself, these actions may all occur prior to any actual decrease of pressure in the tank. Furthermore, if the parts are properly adjusted the valve 12 may be moved to a position such that it will accurately counterbalance the increase in flow from the tank and the pressure in the tank will remain at the control point. It will be noted that the valve 12 will be moved to a position corresponding to the position of the diaphragm 55 under these conditions but that the regulator always remains primarily under the control of the main sensing diaphragm 17.

The construction shown in Figure 4 is substantially similar to that of Figures 1 to 3 and parts therein corresponding to like parts in Figures 1 to 3 are indicated by the same reference numerals plus 100. In this construction the rigid arm or bracket 64 connecting the lever 62 to the piston 53 is replaced by a spring 164 which will yield in response to pressure. With this construction whenever there is a movement of either the motor diaphragm or the secondary control diaphragm 155 the spring 164 will yield to produce a resilient force on the piston 53 tending to move it to a position corresponding to the position of the diaphragm 155. With this construction the force which is produced due to the piston 153 will be proportional to both the amount and the rate of movement so that a proportional plus reset action is provided. Otherwise, the operation is identical to that of Figures 1 to 3.

While two embodiments of the invention have been shown and described, it will be apparent that these are illustrative only and are not to be taken as a definition of the scope of the invention, reference being had for this purpose to the appended claims.

What is claimed is:

1. A regulator to control a condition which is affected by a second condition comprising a motor unit to operate a control device for controlling the condition, a sensitive element movable in response to changes in the condition, control means for the motor unit, mechanism connecting the sensitive element to the control means to operate it, a second sensitive element movable in response to the second condition, and a connection between the second sensitive element and the control means including a fluid dashpot in series to dissipate the effect of the second sensitive element on the control means after a predetermined time interval.

2. A regulator to control a condition which is affected by a second condition comprising a motor unit to operate a control device for the condition, a sensitive element movable in response to changes in the condition, a control device for the motor unit connected to the sensitive element to be moved thereby, a dashpot including a cylinder and piston, one connected to the sensitive element and the other connected to the motor unit, a second cylinder communicating with the first named cylinder, a second piston in the second cylinder, and means responsive to the second condition to move the second piston.

3. A regulator to control a condition which is affected by a second condition comprising a motor unit to operate a control device for the condition, a sensitive element movable in response to changes in the condition, a control device for the motor unit connected to the sensitive element to be moved thereby, a dashpot including a cylinder and piston, one connected to the sensitive element and the other connected to the motor unit, a second cylinder connected to the first named cylinder for movement therewith and in fluid communication therewith, a second piston in the second cylinder, and means independent of the motor unit and the sensitive element to control the position of the second piston.

4. A regulator to control a condition which is affected by a second condition comprising a motor unit to operate a control device for the condition, a sensitive element movable in response to changes in the condition, a control device for the motor unit connected to the sensitive element to be moved thereby, a dashpot including a cylinder and piston, one connected to the sensitive element and the other connected to the motor unit, a second cylinder connected to the first named cylinder for movement therewith and in fluid communication therewith, a second piston in the second cylinder, and means responsive to the second condition to move the second piston.

5. A regulator to control a condition which is affected by a second condition comprising a motor unit to operate a control device for the condition, a sensitive element movable in response to changes in the condition, a control device for the motor unit connected to the sensitive element to be moved thereby, a dashpot including a cylinder and piston, one connected to the sensitive element and the other connected to the motor unit, a second cylinder connected to the first named cylinder for movement therewith and in fluid communication therewith, a second piston in the second cylinder, and means resiliently supporting the second piston resiliently to resist movement thereof when the second cylinder is moved.

6. A regulator to control a condition which is affected by a second condition comprising a motor unit to operate a control device for the condition, a sensitive element movable in response to changes in the condition, a control device for the motor unit connected to the sensitive element to be moved thereby, a dashpot including a cylinder and piston, one connected to the sensitive element and the other connected to the motor unit, a second cylinder connected to the first named cylinder for movement therewith and in fluid communication therewith, a second piston in the second cylinder, a second sensitive element movable in response to changes in the second condition, and a connection from the second sensitive element to the second piston.

7. A regulator to control a condition which is affected by a second condition comprising a motor unit to operate a control device for the condition, a sensitive element movable in response to changes in the condition, a control device for the motor unit connected to the sensitive element to be moved thereby, a dashpot including a cylinder and piston, one connected to the sensitive element and the other connected to the motor unit, a second cylinder connected to the first named cylinder for movement therewith and in fluid communication therewith, a second piston in the second cylinder, a second sensitive element movable in response to changes in the second condition, and means including a spring connecting the second sensitive element to the second piston.

8. A regulator to control a condition which is affected by a second condition comprising a fluid motor, a control valve for the motor to supply a controlled operating pressure thereto, a diaphragm sensitive to the condition connected to the control valve to move it thereby to control the motor, a dashpot structure including a pair of intercommunicating cylinders connected to the motor to be moved thereby, a piston in one of the cylinders connected to the control valve to exert a resetting force thereon, a second piston in the other of the cylinders, and means independent of the fluid motor and the diaphragm to control the position of the second piston.

9. A regulator to control a condition which is affected by a second condition comprising a fluid motor, a control valve for the motor to supply a controlled operating pressure thereto, a diaphragm sensitive to the condition connected to the control valve to move it thereby to control the motor, a dashpot structure including a pair of intercommunicating cylinders connected to the motor to be moved thereby, a piston in one of the cylinders connected to the control valve to exert a resetting force thereon, a second piston in the other of the cylinders, a second diaphragm sensitive to the second condition, and a connection from the second diaphragm to the second piston.

10. A regulator to control a condition which is affected by a second condition comprising a fluid motor, a control valve for the motor to supply a controlled operating pressure thereto, a diaphragm sensitive to the condition connected to the control valve to move it thereby to control the motor, a dashpot structure including a pair of intercommunicating cylinders connected to the motor to be moved thereby, a piston in one of the cylinders connected to the control valve to exert a resetting force thereon, a second piston in the other of the cylinders, a second diaphragm sensitive to the second condition, and means including a spring connecting the second diaphragm to the second piston.

11. A regulator to control a condition which is affected by a second condition comprising a motor unit to operate a control device for controlling the condition, a sensitive element movable in response to changes in the condition, control means for the motor unit, mechanism connecting the sensitive element to the control means to operate it, means including a dash pot connecting the motor unit to the control means initially to transmit force from the motor unit to the control means and gradually to dissipate such force, a second sensitive element movable in response to the second condition, and means including a dash pot connecting the second sensitive element to the control means initially to transmit force from the second element to the control means and then gradually to dissipate such force.

12. A regulator to control a condition which is affected by a second condition comprising a motor unit to operate a control device for controlling the condition, a sensitive element movable in response to changes in the condition, control means for the motor unit, mechanism connecting the sensitive element to the control means to operate it, means including a dash pot connecting the motor unit to the control means initially to transmit force from the motor unit to the control means and gradually to dissipate such force, a second sensitive element movable in response to the second condition, and means including a dash pot and a spring in series connecting the second sensitive element to the control means initially to transmit from the second element to the control means a force proportional to the extent and rate of movement of the second element and gradually to dissipate such force.

References Cited in the file of this patent

UNITED STATES PATENTS

| | | |
|---|---|---|
| 1,013,184 | Kramer | Jan. 2, 1912 |
| 1,725,374 | Rush | Aug. 20, 1929 |
| 1,796,968 | Smoot | Mar. 17, 1931 |
| 1,962,676 | Albright | June 12, 1934 |
| 2,020,847 | Mitereff | Nov. 12, 1935 |
| 2,040,109 | Spence | May 12, 1936 |
| 2,098,914 | Gorrie | Nov. 9, 1937 |
| 2,207,921 | Huxford | July 16, 1940 |
| 2,273,407 | Lilja | Feb. 17, 1942 |
| 2,303,752 | Meredith | Dec. 1, 1942 |
| 2,324,514 | Kalin | July 20, 1943 |
| 2,399,938 | Pett | May 7, 1946 |

FOREIGN PATENTS

| | | |
|---|---|---|
| 453,928 | Great Britain | 1936 |